UNITED STATES PATENT OFFICE.

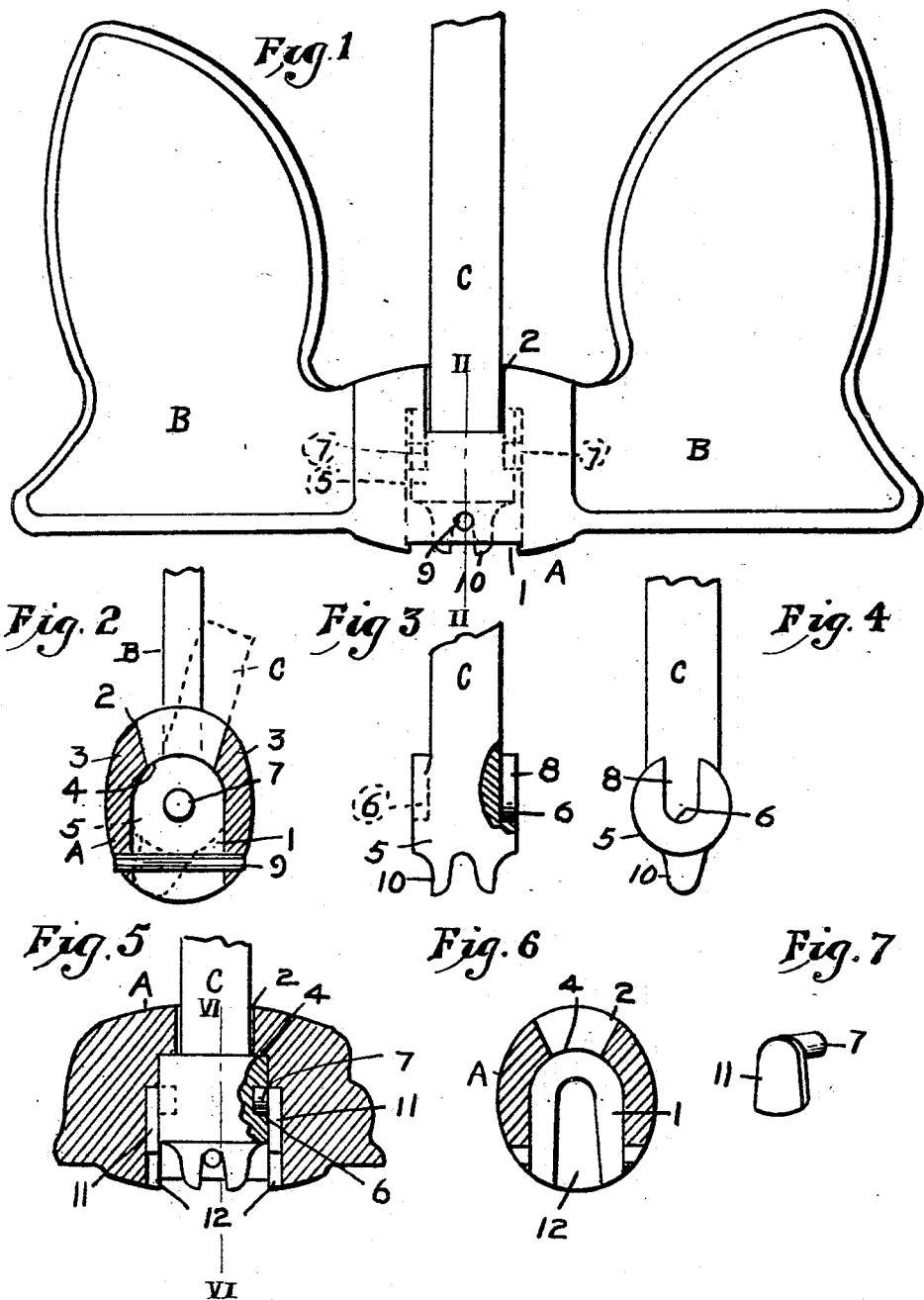

FREDERICK BALDT, JR., OF TARENTUM, PENNSYLVANIA.

ANCHOR.

1,297,987.  Specification of Letters Patent.  Patented Mar. 25, 1919.

Application filed August 21, 1918. Serial No. 250,809.

*To all whom it may concern:*

Be it known that I, FREDERICK BALDT, Jr., a citizen of the United States, and residing in the borough of Tarentum, in the county of Allegheny and State of Pennsylvania, have invented or discovered new and useful Improvements in Anchors, of which the following is a specification.

My invention consists in certain new and useful improvements in stockless anchors wherein the shank is pivotally attached to the head.

More particularly, the present invention relates to improvements in the form of pivotal attachment used to connect the shank to the head.

In some cases in the prior art, this pivotal attachment has been effected by providing the head with a central recess in whose wall is formed a semi-cylindrical bearing in which is journaled a cylindrical enlargement of the shank butt, and also providing holes through the head and such enlargement, concentric with first mentioned pivotal attachment, through which is inserted a long bolt or shaft, thus forming a double pivotal connection between shank and head. This method of attachment is objectionable, as it is impossible to obtain axial coincidence of the two forms of pivoting without expensive boring and machine work, thus making the finished anchor too expensive. Without such axial coincidence the shank will bind in the head, thus rupturing the pivot elements or breaking or bending the shank. Without free pivotal movement between the shank and the head, the substantial advantages of a stockless anchor over the old or one-piece anchor are lost. At the present time such bolts or shafts are difficult to obtain in the market, owing to the unusual demand for shafting.

The object I have in view is the provision of a double pivot form of connection between the head and shank of a stockless anchor, such pivot connection being inexpensive but insuring free play between the head and shank without danger of binding, breakage or bending.

I effect this desirable result by adopting the pivot produced by journaling the cylindrical enlargement of the shank in the semi-cylindrical bearing formed in the wall of the central recess of the head, but doing away with the boring of a longitudinal hole in the head and in the butt of the shank and with the use of a pivot bolt. For the latter named pivotal connection, I substitute trunnions extending out from the walls of the recess in the head and engaging seats in the ends of the cylindrical enlargement which forms the butt of the shank, said trunnions and seats being concentric with the semi-cylindrical bearing and the cylindrical enlargement.

As is well known, the shank and head are assembled by inserting the shank from the rear through the transverse slot in the head which connects the inner end of the recess with the front of the head and which provides clearance for the swing of the shank, and seating the cylindrical butt of the shank in the semi-cylindrical bearing. It is thus necessary to provide clearance for the trunnions so that they may engage their seats in the ends of the shank butt. I show two methods of accomplishing this purpose. The first and preferred method is by providing radial slots in the ends of the shank butt through which the trunnions pass to engage the axial seats, while the second method is to provide trunnion blocks, with the trunnions integral or rigid therewith, which blocks are adapted to occupy seats in the end walls of the central recess in the head, so that the trunnions may be first inserted in the seats in the end of the shank butt and the trunnion blocks and butt of the shank inserted into the central recess of the head with the one single operation.

To prevent the accidental rearward movement of the shank butt out of the central recess of the head, I provide a bolt which is inserted through the end walls of the central recess of the head, spanning said recess in the plane of pivotal movement of the head and also extending through a slot or bifurcation in the extreme butt end of the shank.

In the accompanying drawings, which are intended to illustrate the principles of my invention, without limiting the scope of the same to the construction shown, Figure 1 is a broken side elevation of a stockless anchor embodying my invention, the pivot connection between the shank and head being shown in dotted lines; Fig. 2 is a cross section taken along the line II—II in Fig. 1, the shank being shown swung to the limit of its movement to one side; Fig. 3 is a side elevation of the butt of the shank; Fig. 4 is a similar end view of the same; Fig. 5 is a longitudinal section of the central portion of the head showing a modified form of pivotal connection between the head and the shank; Fig. 6 is a cross section of the head taken along the line VI—VI in Fig. 5, the shank being omitted, and Fig. 7 is a perspective view of one of the trunnion blocks used in this form of connection.

The following is a detailed description of the drawings.

A represents the head of the anchor with the flukes B integral therewith or rigidly attached thereto. The said head is provided within a central recess 1 extending inwardly from the rear of the head and connected to the front thereof by a transverse slot 2 having radially inclined end walls 3. The inner walls of the recess 1, on either side of the slot 2, form a pair of semi-circular bearings 4 which are engaged by the cylindrical boss 5 which forms the butt of the shank C, thus pivotally connecting the shank to the head. 6 represents a seat in each end of the boss 5, axial thereof and engaged, when the elements of the anchor are assembled, by trunnions 7 extending into the recess 1 from its end walls and either integral with the head or rigidly fixed therein. To enable the shank and head to be easily assembled together, the ends of the boss 5 are provided with radial slots 8 of equal depth with the seats 6 and connecting the same with the outer perimeter of the boss 5 in the plane of the stem of the shank C. Thus the shank may be inserted from the rear of the head and when the boss 5 approaches its semi-cylindrical bearing, the trunnions 7 pass along the slots 8 and finally occupy the seats 6 when the boss 5 is seated in its bearing. To prevent the accidental rearward movement of the shank in relation to the head, I prefer to provide a cross bolt 9 which is inserted through the end walls of the recess 1 in the plane of the swing of the shank, and to provide clearance for the extreme butt 10 of the shank I prefer to slot or bifurcate the latter, as shown.

Another form is illustrated in Figs. 5, 6 and 7 wherein the trunnions 7 are not permanently mounted on the end walls of the recess 1 but are integral with or rigidly mounted on small trunnion blocks 11 which, when the anchor is assembled, are inserted in seats 12 in the end walls of the recess 1. Thus I am enabled to omit the slots 8 in the ends of the shank butt, as the trunnions 7 are first inserted in the seats 6 in the end of said butt, and the shank and trunnion blocks are together inserted into the recess 1, the said blocks moving into the seats 12 as the boss 5 engages the bearings 4.

I prefer to prolong the butt of the shank C, as at 10 to form a bearing against the side walls of the recess 1 when the shank is at either end of its swing, thus providing a double contact by the shank, at either side of its pivotal connection, with the head, thereby relieving and distributing the strains and preventing excess strains on the pivoting.

To insure freedom of pivotal action, I prefer to have the studs 7 fit with considerable looseness in the seats 6.

It is evident from the foregoing that my anchor may be made at much less expense than other forms of stockless anchors, and avoid the expensive boring of long bolt holes and other expensive machining, enabling me to cast the elements of the anchor without afterward resorting to more than a minor dressing of the castings before assembling.

What I desire to claim is:—

1. In a stockless anchor, the combination of a head carrying flukes and provided with a central recess extending from the rear thereof and a slot transverse of the head and connecting said recess with the front of the head, said recess having semi-cylindrical bearings on either side of said slot, a shank extending through said slot and having its butt in the form of a cylindrical boss journaled in said bearings and provided with axial seats at either end, and trunnion blocks occupying seats in the end walls of said recess and having projections concentric with said bearings engaging the seats in the ends of said boss, substantially as described.

2. In a stockless anchor, the combination of a head carrying flukes and provided with a central recess extending from the rear thereof and a slot transverse of said head connecting said recess with the front of the head, said recess having semi-cylindrical bearings at either side of said slot, a shank extending through said slot and having its butt in the form of a cylindrical boss journaled in said bearings and provided with axial seats at either end, and trunnion blocks occupying seats in the end walls of said recess extending inwardly from the rear of said recess and provided with projections concentric with said bearing surfaces engaging the seats in the ends of said boss, substantially as described.

Signed at Tarentum Pa. this 19th day of August 1918.

FREDERICK BALDT, Jr.